(12) United States Patent
Boileau (10) Patent No.: US 12,208,994 B2
(45) Date of Patent: Jan. 28, 2025

(54) ASSEMBLY AND METHOD FOR HANDLING AN AIRCRAFT PROPULSION UNIT

(71) Applicant: Safran Nacelles, Gonfreville l'Orcher (FR)

(72) Inventor: Patrick Boileau, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 893 days.

(21) Appl. No.: 17/188,520

(22) Filed: Mar. 1, 2021

(65) Prior Publication Data
US 2021/0179393 A1 Jun. 17, 2021

Related U.S. Application Data

(63) Continuation of application No. PCT/FR2019/052001, filed on Aug. 30, 2019.

(30) Foreign Application Priority Data

Aug. 31, 2018 (FR) ...................................... 18/57868

(51) Int. Cl.
*B66C 1/10* (2006.01)
*B64D 29/06* (2006.01)
(Continued)

(52) U.S. Cl.
CPC .............. *B66C 1/107* (2013.01); *B64D 29/06* (2013.01); *B64D 33/02* (2013.01); *B64F 5/50* (2017.01); *B64D 2033/0273* (2013.01)

(58) Field of Classification Search
CPC .................... B64D 29/06; B64D 33/02; B64D 2033/0273; B64F 5/50; B66C 1/107; B66C 1/108; B66C 1/127
See application file for complete search history.

(56) References Cited

U.S. PATENT DOCUMENTS

| | | | | |
|---|---|---|---|---|
| 955,130 | A * | 4/1910 | Burwell | B63C 3/06 187/405 |
| 2,703,252 | A * | 3/1955 | Blackwell | B66C 1/62 294/81.4 |

(Continued)

FOREIGN PATENT DOCUMENTS

| | | | |
|---|---|---|---|
| CN | 106114907 | 11/2016 | |
| EP | 0516388 A2 * | 12/1992 | B64D 27/18 |

(Continued)

OTHER PUBLICATIONS

International Search Report for International Application PCT/FR2019/052001, mailed Jan. 22, 2020.

(Continued)

*Primary Examiner* — Saul Rodriguez
*Assistant Examiner* — Brendan P Tighe
(74) *Attorney, Agent, or Firm* — Burris Law, PLLC (57) ABSTRACT

A handling assembly of a propulsion assembly includes a nacelle and an aircraft turbojet engine. The handling assembly also includes a handling envelope covering at least half of the circumference of an outer wall of an air inlet of the nacelle, when the propulsion assembly is mounted on said handling assembly, and at least two interfaces for attaching slings, the slings being connected to a hoisting system which is external to said handling assembly. A method for handling a propulsion assembly is also disclosed.

15 Claims, 5 Drawing Sheets

(51) Int. Cl.
    *B64D 33/02*         (2006.01)
    *B64F 5/50*          (2017.01)

(56)             References Cited

U.S. PATENT DOCUMENTS

| | | | |
|---|---|---|---|
| 5,870,824 A | 2/1999 | Lilja et al. | |
| 6,170,141 B1 * | 1/2001 | Rossway | B64F 5/50 |
| | | | 206/319 |
| 6,485,247 B1 | 11/2002 | Groves et al. | |
| 2008/0011932 A1 * | 1/2008 | Stretton | B66C 1/107 |
| | | | 414/800 |
| 2016/0376015 A1 | 12/2016 | Lacko | |
| 2017/0166331 A1 * | 6/2017 | Kohn | B62B 3/04 |
| 2018/0283215 A1 * | 10/2018 | Dubois | B66C 1/107 |
| 2019/0359352 A1 * | 11/2019 | Cooper | B64F 5/40 |
| 2023/0348084 A1 * | 11/2023 | Mallampati | B64F 5/50 |

FOREIGN PATENT DOCUMENTS

| | | | |
|---|---|---|---|
| FR | 2724920 A1 * | 3/1996 | B66C 1/10 |
| FR | 3018773 | 9/2015 | |
| FR | 3078058 A1 * | 8/2019 | B64D 27/26 |
| GB | 2394940 | 5/2004 | |
| WO | WO-2019162610 A1 * | 8/2019 | B64C 7/02 |

OTHER PUBLICATIONS

Office Action issued in corresponding CN Application 201980055871.4, issued Aug. 25, 2023, and an English Translation, 23 pages.

\* cited by examiner

ASSEMBLY AND METHOD FOR HANDLING AN AIRCRAFT PROPULSION UNIT

CROSS-REFERENCE TO RELATED APPLICATIONS

This application is a continuation of International Application No. PCT/FR2019/052001, filed on Aug. 30, 2019, which claims priority to and the benefit of FR 18/57868 filed on Aug. 31, 2018. The disclosures of the above applications are incorporated herein by reference.

FIELD

The present disclosure relates to an assembly for handling an aircraft propulsion unit and to a method for handling such an aircraft propulsion unit.

BACKGROUND

The statements in this section merely provide background information related to the present disclosure and may not constitute prior art.

A multi-engine aircraft is driven by several propulsion units each comprising a turbojet engine housed in a nacelle.

Figure 1:
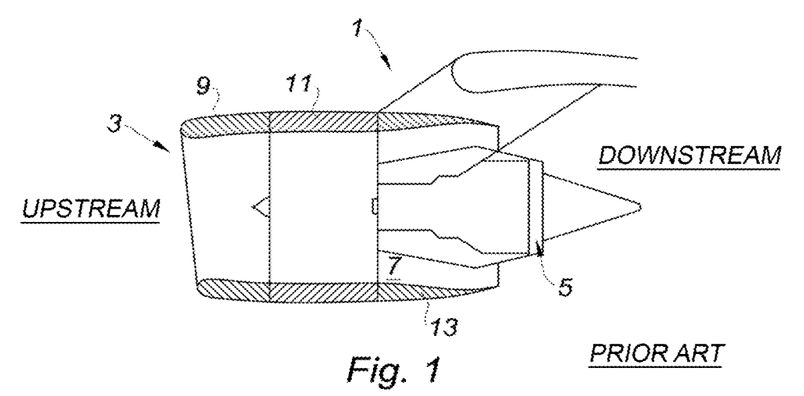
FIG. 1 is a longitudinal sectional view of a propulsion unit of the prior art.

As represented in FIG. 1, a propulsion unit 1 comprises a nacelle 3 and a turbojet engine 5, for example of the bypass type, capable of generating, via the blades of the rotating fan, a flow of hot gases (also called primary flow) and a flow of cold air (also called secondary air flow) which circulates outside the turbojet engine through an annular passage 7, also called annular flow path, formed between two concentric walls of the nacelle. The primary and secondary flows are ejected from the turbojet engine from the rear of the nacelle.

The nacelle 3 generally has a tubular structure comprising an upstream section, or air inlet 9, located upstream of the turbojet engine, a middle section 11 which is intended to surround a fan of the turbojet engine, a downstream section 13, which is intended to surround the combustion chamber of the turbojet engine, carrying a thrust reverser device, and may be terminated by an ejection nozzle located downstream of the turbojet engine.

In order to carry out maintenance operations on the nacelle, it is desirable to be able to manipulate the air inlet of the nacelle, independently of the middle and downstream sections thereof.

Figures 2, 3:
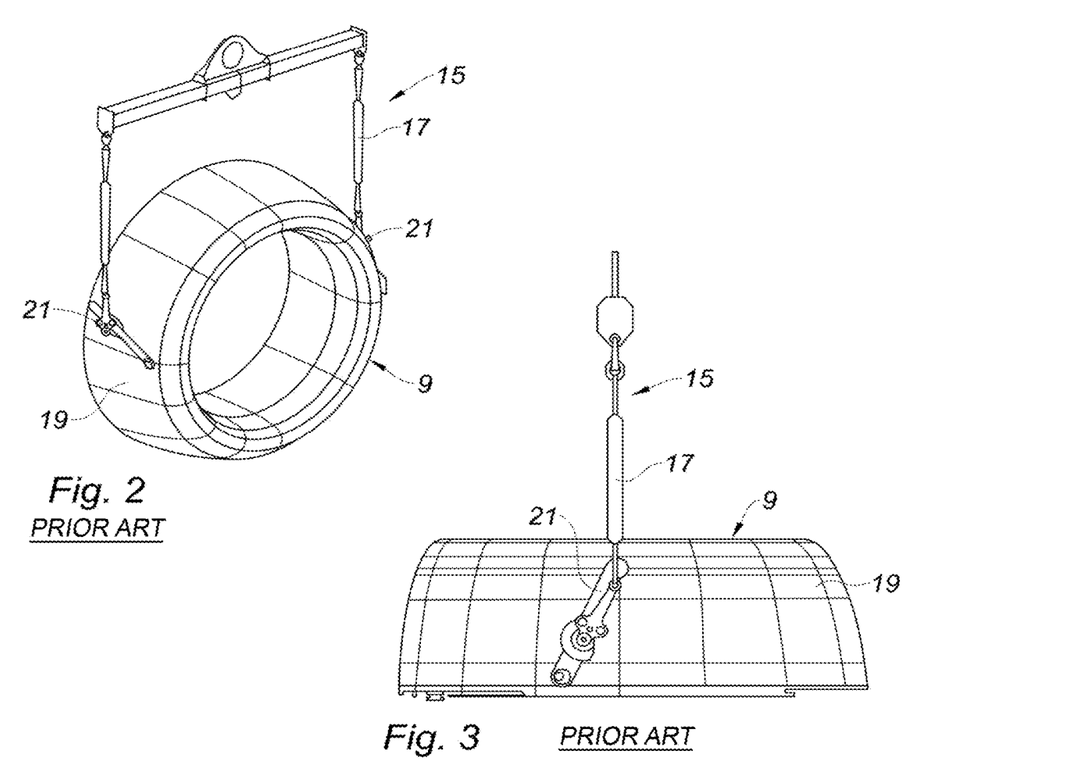
FIGS. 2 and 3 illustrate a handling assembly of the prior art supporting an air inlet of a turbojet engine nacelle.

Reference is made to FIG. 2 illustrating a variation of a propulsion unit allowing for manipulation of an air inlet using a conventional handling assembly.

The conventional handling assembly 15 includes two slings 17, which are connected and fastened at the lower end thereof to an outer wall 19 of the air inlet 9 of the nacelle in contact with the external air flow flowing around the nacelle when the nacelle is in operation.

For this purpose, the nacelle includes, at the outer wall 19 thereof, two fastening points 21 or more, forming hoisting points on which fittings, which are supporting the slings 17, are mounted.

When the slings 17 are mounted on the hoisting points 21 of the air inlet 9, an operator can manipulate the air inlet, for example as illustrated in FIG. 3, by tilting it vertically in order to be able to place it on the ground in this vertical position.

A recurring challenge for aircraft manufacturers is that reducing the aerodynamic disturbances of the nacelle. For this purpose, the nacelle manufacturers seek to make some surfaces of the nacelle smooth, in particular the outer wall of the nacelle.

This can be partially achieved by providing a nacelle including an air inlet called laminar air inlet, that is to say an air inlet devoid of aerodynamic accident, that is to say in particular devoid of points for fastening the fittings on which the slings of the conventional handling assembly are intended to be mounted.

The removal of the fastening points from the outer wall of the air inlet of the nacelle makes it difficult to handle the nacelle using conventional handling assemblies.

SUMMARY

This section provides a general summary of the disclosure and is not a comprehensive disclosure of its full scope or all of its features.

The present disclosure provides an assembly for handling an air inlet of a nacelle, in particular of the type which includes no attachment point at the outer wall thereof.

The present disclosure also provides an assembly for handling a propulsion unit including a nacelle and an aircraft turbojet engine, said handling assembly including a handling envelope covering at least the half-circumference of an outer wall of an air inlet of the nacelle, when said propulsion unit is mounted on said handling assembly, at least two sling fastening interfaces, said slings being intended to be connected to a hoisting system external to said handling assembly.

Thus, by providing a handling assembly including a handling envelope configured to receive sling fastening interfaces, the handling assembly can be used on the nacelles whose air inlet is laminar, that is to say which does not include fitting fastening points.

According to optional features of the handling assembly of the present disclosure: said handling envelope further includes at least two pockets for receiving said at least two sling fastening interfaces, configured to hold said at least two sling fastening interfaces in position on said handling envelope.

In one form of the present disclosure, the sling fastening interface includes a plate, shaped to be inserted into the receiving pocket, and a sling fastening fitting, which is secured to said plate, configured to receive the sling.

In another form, the pockets for receiving said at least two sling fastening interfaces are positioned on either side of a longitudinal plane of the handling assembly.

In still another form, the pockets for receiving said at least two fastening interfaces include means for closing said receiving pocket on the handling envelope; the means for closing said receiving pocket on the handling envelope is a self-gripping strip of the Velcro® type or a zip.

In yet another form, the handling envelope includes a lateral extension which is shaped to at least partially cover the circumference of a downstream edge of the air inlet of the nacelle when the propulsion unit is mounted on the handling assembly.

In another form, the handling assembly includes an inflatable flexible element, coming into contact, when said inflatable flexible element is inflated, at least with an inner wall of the air inlet of the nacelle when the propulsion unit is mounted on said handling assembly.

In some configurations, the inflatable flexible element occupies the entire inner space defined by the inner wall of the air inlet of the nacelle when said inflatable flexible element is inflated and when the propulsion unit is mounted on said handling assembly.

In some configurations, the inflatable flexible element includes an upstream protuberance coming into contact with a leading edge of the air inlet of the nacelle when said inflatable flexible element is inflated and when the propulsion unit is mounted on said handling assembly.

In some configurations, the handling assembly includes main fastening straps, a first end of which is attached to the inflatable flexible element and a second end of which is attached to the handling envelope.

In some configurations, the handling assembly includes a circumferential master strap, positioned on a flange for fastening the air inlet of the nacelle upstream of a fan casing of the turbojet engine.

In some configurations, the handling assembly includes additional fastening straps, a first end of which is attached to the circumferential master strap and a second end of which is attached to the handling envelope.

The present disclosure also discloses a method for handling a propulsion unit, said propulsion unit comprising: a nacelle comprising an air inlet, and an aircraft turbojet engine, including a fan casing, on which said air inlet of said nacelle is attached, said handling method including the following successive steps aiming at: covering at least the half-circumference of an outer wall of the air inlet of the nacelle with a handling envelope; positioning the sling fastening interfaces on the handling envelope; connecting the sling fastening interfaces to a hoisting system external to said handling assembly by slings; and detaching said air inlet from the fan casing of the turbojet engine.

In some configurations, during the step aiming at positioning the sling fastening interfaces on the handling envelope, the sling fastening interfaces are positioned inside the pockets for receiving the handling envelope.

In some configurations, the handling method includes a first additional step prior to the step consisting in covering at least the half-circumference of the outer wall of the air inlet of the nacelle with the handling envelope, the first additional step aiming at inflating an inflatable flexible element of the handling assembly inside an inner space defined by an inner wall of the air inlet of the nacelle until said flexible element comes into contact at least with the inner wall of the air inlet of the nacelle.

In some configurations, the handling method includes a second additional step subsequent to the step consisting in detaching the air inlet from the fan casing of the turbojet engine, the second additional step aiming at securing the handling assembly by attaching a first end of main fastening straps to the inflatable flexible element and a second end of said main fastening straps to the handling envelope.

In some configurations of the handling method of the present disclosure, it includes a third additional step, prior to the step in which the air inlet is detached from the fan casing of the turbojet engine, aiming at installing a circumferential master strap on a fastening flange of the air inlet of the nacelle upstream of the fan casing of the turbojet engine and at attaching said master strap to the inflatable flexible element of the handling envelope by additional fastening straps.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and in the claims, the terms "upstream" and "downstream" should be understood relative to the circulation of the air flow inside the propulsion unit formed by the nacelle and the turbojet engine, that is to say from left to right with reference to FIG. 1.

Similarly, the terms "inner" or "internal" and "outer" or "external" will be used without limitation with reference to the radial distance relative to the longitudinal axis of the propulsion unit, the term "inner" or "internal" defining an area which is radially closer to the longitudinal axis of the nacelle, as opposed to the term "outer" or "external."

Moreover, in the description and the claims, in order to clarify the description and the claims, the terminology "longitudinal", "vertical" and "transverse" will be adopted without limitation with reference to the direct trihedron L, V, T which is indicated in the Figures, whose longitudinal axis L is parallel to the longitudinal axis of the handling assembly, the longitudinal axis of the handling assembly corresponding to the longitudinal axis of the propulsion unit when the latter is supported by the handling assembly.

Furthermore, in all figures, identical or similar references represent identical or similar members or sets of members.

Figure 4:
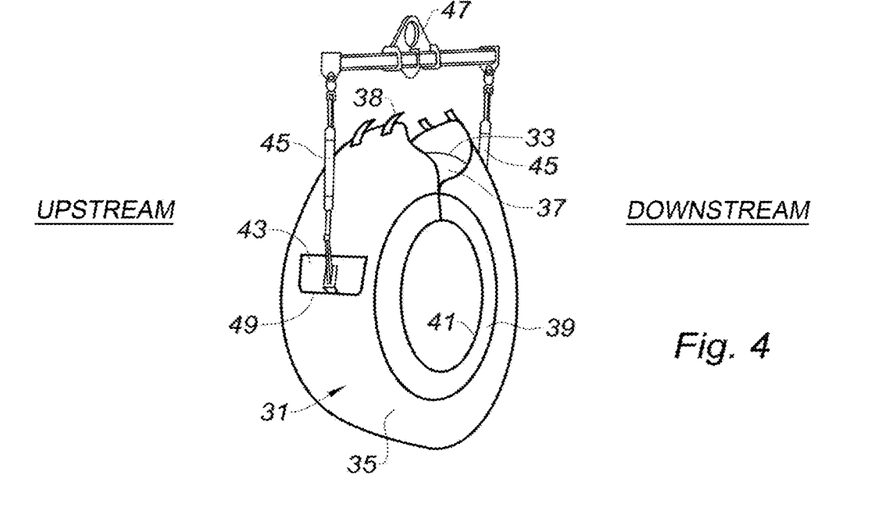
FIGS. 4 and 5 represent an isometric view of the handling assembly obtained according to one form of the present disclosure, supporting an aircraft turbojet engine nacelle air inlet.
Figure 5:
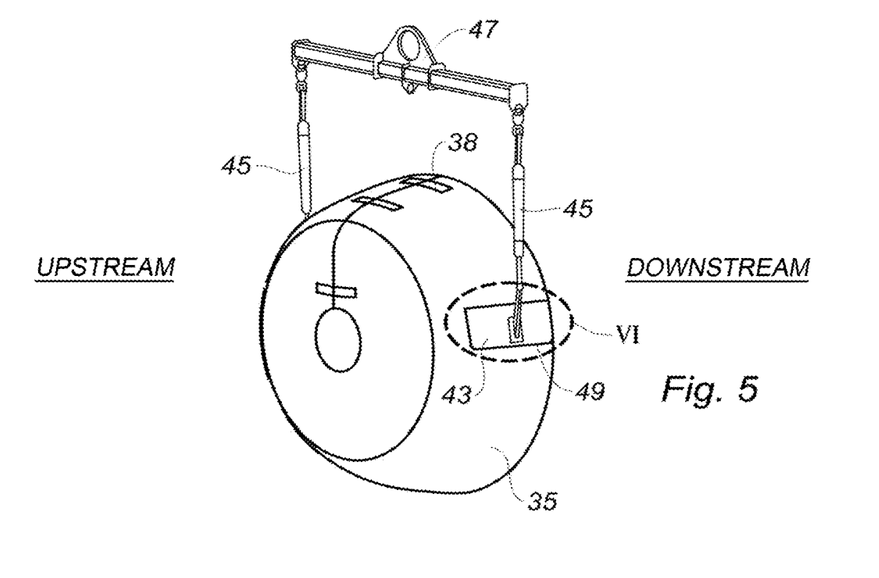

Reference is made to FIGS. 4 and 5, illustrating in isometric view the handling assembly 31 obtained according to one form of the present disclosure, supporting an air inlet 33 of a turbojet engine nacelle, the handling assembly being respectively illustrated in FIGS. 4 and 5 in the open position and in the closed position.

The handling assembly 31 includes a handling envelope 35 configured to support a turbojet engine nacelle air inlet.

For this purpose, the handling envelope 35 can for example be obtained in any woven technical fabric such as Cordura®, in a non-woven technical fabric or in reinforced PVC.

The handling envelope 35 covers the outer wall 37 of the air inlet 33. In this form of the handling assembly 31, the handling envelope 35 preferably covers the entire circumference of the outer wall 37 of the air inlet when the handling assembly is in the closed position. However, it can be considered to size the handling envelope 35 so that it covers only the half-circumference of the outer wall 37 of the air inlet when the handling assembly is in the closed position.

The closure of the handling envelope 35 is obtained thanks to closure means, for example positioned at "twelve o'clock" when the handling assembly supports an air inlet. Such a closure means can for example be obtained by self-gripping strips 38 of the Velcro® type.

According to a variation, the handling envelope 35 includes a lateral extension 39 shaped to cover all or part of the circumference of a downstream edge 41 of the air inlet 33 of the nacelle.

The handling assembly 31 further includes two interfaces 43 (only one is shown in FIGS. 4 and 5) allowing the fastening of slings 45. The slings 45 are intended to be connected to a hoisting system 47, external to the handling assembly 31, which allows manipulating the handling assembly supporting the air inlet of the nacelle. For this purpose, the handling envelope 35 includes two pockets 49 for receiving the sling fastening interfaces. The pockets 49 for receiving the sling fastening interfaces 43 are preferably positioned on either side of a longitudinal plane (L, V) of the handling assembly. The receiving pockets 49 are configured to hold the sling fastening interfaces 43 in position on the handling envelope 35.

Figure 6:
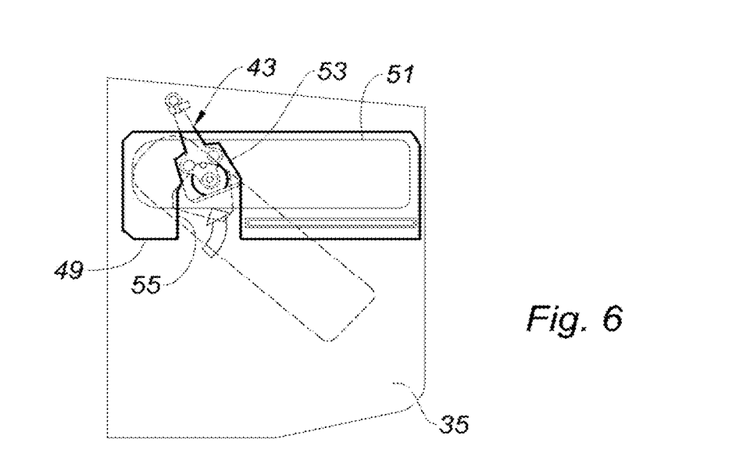
FIG. 6 is a front and detailed view of the area VI of FIG. 5.

Reference is made to FIG. 6, which is a front and detailed view of the area VI of FIG. 5 and which illustrates the receiving pocket 49 in which a sling fastening interface 43 is inserted.

According to a variation, the sling fastening interface 43 includes a plate 51 and a fitting 53 secured to the plate 51, on which the sling 45 is fastened. The plate 51 is shaped to be inserted into the receiving pocket 49. The receiving pocket 49 adopts the general shape of a rectangle, which extends along the longitudinal axis L defined by the direct trihedron L, V, T is represented in the figures.

The receiving pocket 49 has an opening 55 which receives the fitting 53 of the sling fastening interface 43. The receiving pocket 49 is further equipped with a closure means, allowing it to be closed on the handling envelope 35, which can be obtained thanks to a self-gripping strip of the Velcro® type or thanks to a zip.

Figure 7:
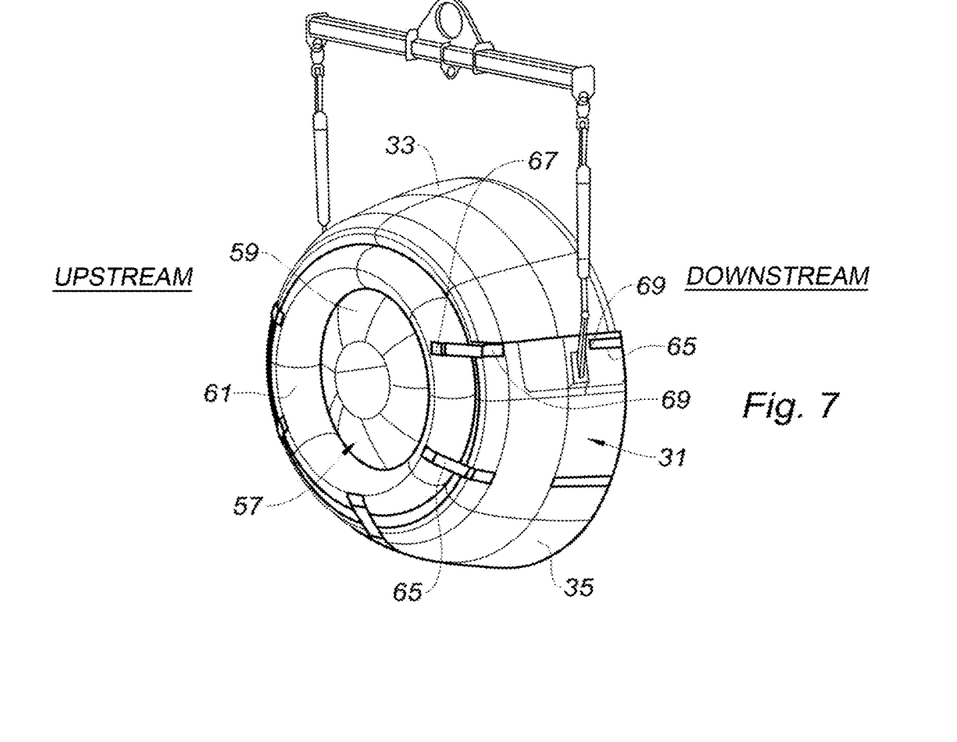
FIG. 7 is an isometric view of the handling assembly which is obtained according to another form of the present disclosure, supporting an aircraft turbojet engine nacelle air inlet.

Reference is made to FIG. 7, illustrating, in isometric view, the handling assembly 31 which is obtained according to another form of the present disclosure, supporting the air inlet 33 of a turbojet engine nacelle.

According to this form, the handling assembly 31 further includes an inflatable flexible element 57, which can for example be obtained in a plastic material such as PVC.

The inflatable flexible element 57 includes a central balloon 59 adopting a generally cylindrical shape. The inflatable flexible element 57 comes into contact, when it is inflated, with an inner wall of the air inlet 33 of the nacelle when the propulsion unit is mounted on said handling assembly, the inner wall of the air inlet being defined by the wall which comes into contact with the air flow taken in by the propulsion unit when the propulsion unit is in operation. When the inflatable flexible element 57 is inflated, it occupies the entire inner space defined by the inner wall of the air inlet of the nacelle when the propulsion unit is mounted on the handling assembly 31.

According to a variant, the inflatable flexible element 57 includes an upstream protuberance 61, or upstream coil, which can adopt a general toric shape. When inflated, the upstream protuberance 61 comes into contact with a leading edge of the air inlet 33 of the nacelle when the propulsion unit is mounted on the handling assembly 31

The upstream protuberance 61 can be an integral part of the inflatable flexible element 57, that is to say that the central balloon 59 is extended at its upstream portion by the upstream protuberance 61.

Alternatively, the upstream protuberance 61 can be related to the central balloon 59. In this case, the inflatable flexible element 57 includes two independent subassemblies formed by the central balloon 59, on the one hand, and by the upstream protuberance 61, on the other hand.

The presence of such an upstream protuberance 61 defines a stop at the leading edge of the air inlet 33 when the handling assembly 31 supports the air inlet.

This allows protecting the air inlet of the nacelle from possible impacts that may occur during the handling thereof.

According to a variation of the handling assembly 31 which is disclosed in FIG. 7, the handling assembly may include a plurality of main fastening straps 65 distributed over the circumference of the handling envelope 35. Each fastening strap 65 includes a first end 67 attached to the inflatable flexible element 57 and a second end 69 attached to the handling envelope, 35. To this end, the upstream protuberance 61 and the central balloon 59 include a plurality of anchor points of the main fastening straps. Once in position, the main fastening straps provide holding the handling envelope on the inflatable flexible element. The fastening straps thus allow the handling envelope to be tensioned around the air inlet.

The handling method implemented by the handling assembly 31, which is disclosed in FIG. 7, is now described with reference to FIGS. 8 to 10 which illustrate a sequence of disassembly of the air inlet 33.

Figure 8:
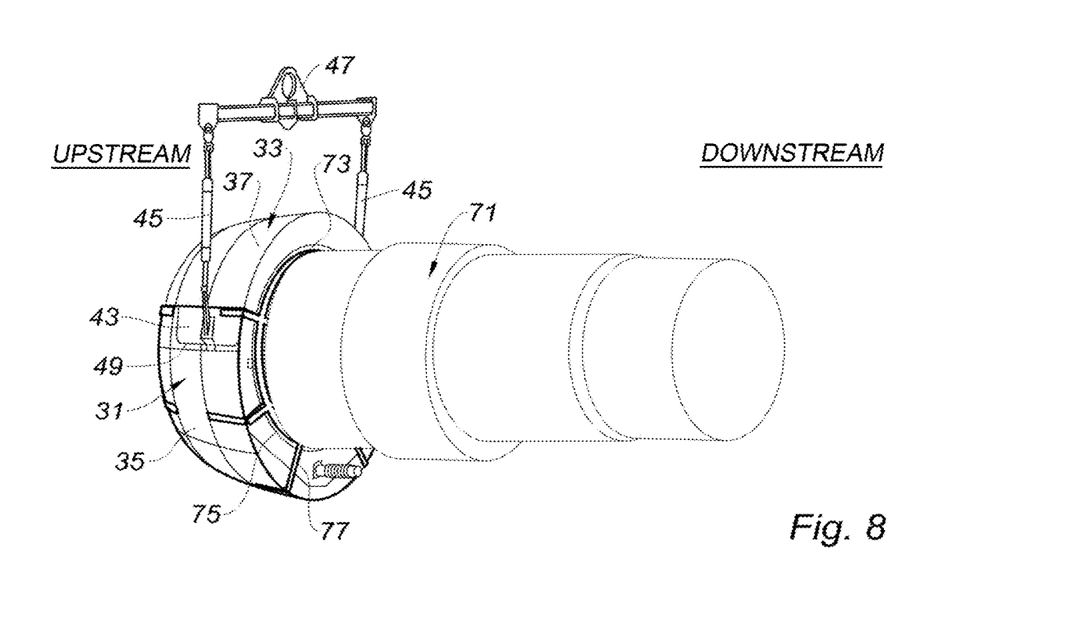
FIGS. 8 to 10 illustrate a sequence of disassembly of an air inlet, the air inlet being manipulated by the handling assembly obtained according to the form shown in FIG. 7.
Figure 9:
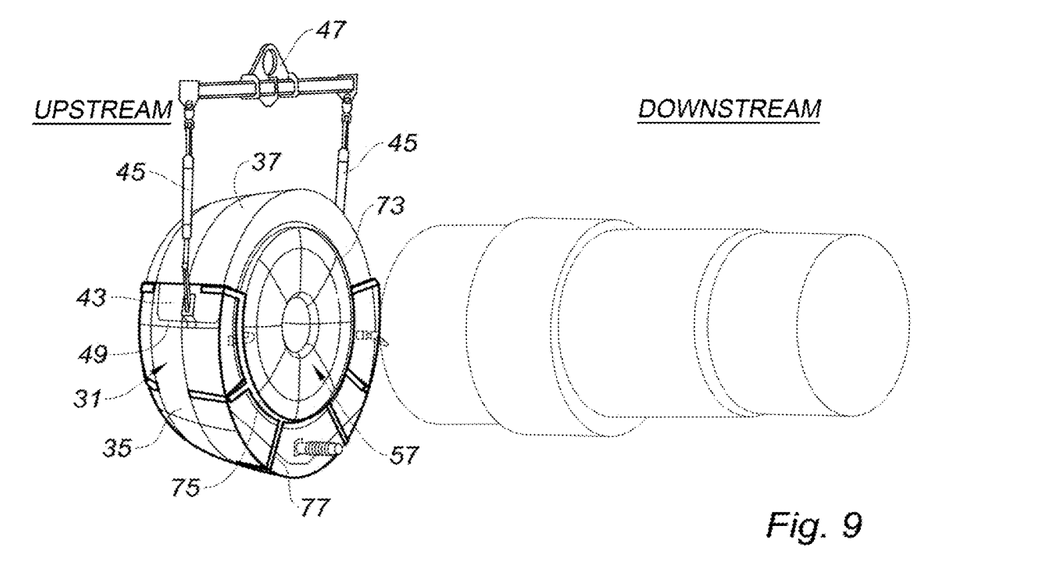
Figure 10:
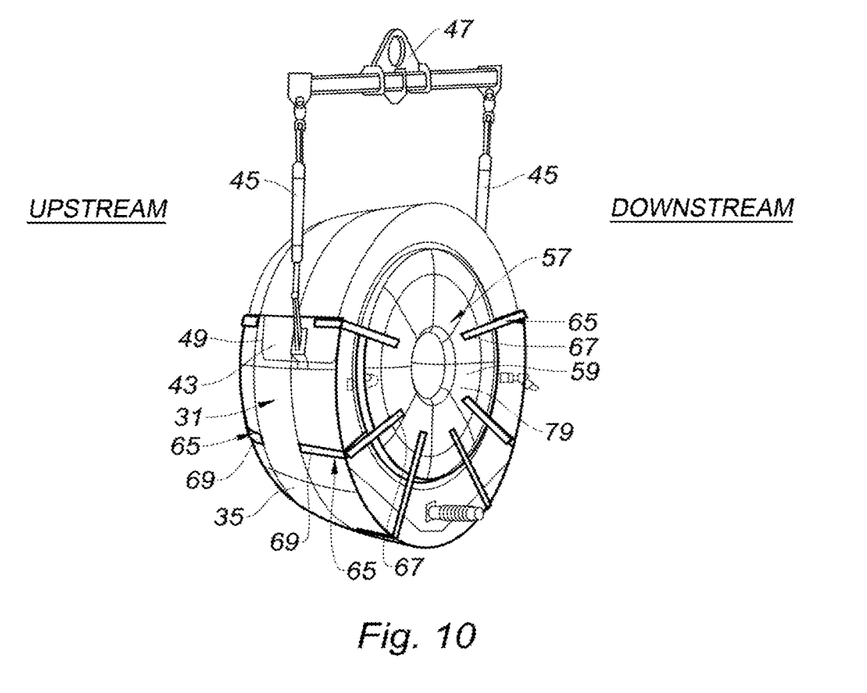

In the example represented in FIGS. 8 to 10, one seeks to manipulate the air inlet 33 of a nacelle. The middle and downstream sections of the nacelle have been occulted from the Figure for a better visibility. The air inlet 33 of the nacelle is mounted on the fan casing of the turbojet engine 71 via a circumferential downstream fastening flange 73.

The inflatable flexible element 57 of the handling assembly 31 is inflated within the inner space defined by the inner wall of the air inlet of the nacelle. Once inflated, the inflatable flexible element 57 comes into contact with the inner wall of the air inlet of the nacelle. If the inflatable element includes the upstream protuberance, this upstream protuberance is also inflated at this stage.

The outer wall 37 of the air inlet 33 of the nacelle is then covered thanks to the handling envelope 35. As previously shown, at least the half-circumference of the outer wall of the air inlet is covered is with the handling envelope 35.

The fan cowls (not represented) of the nacelle are then opened or disassembled, these cowls surrounding the fan casing of the turbojet engine.

At this stage, it is made possible to optionally install a circumferential master strap 75 on the fastening flange 73 of the air inlet of the nacelle on the fan casing of the turbojet engine 71, then to attach the master strap 75 to the handling envelope 35 by additional fastening straps 77.

The sling fastening interfaces 43 are then positioned inside the pockets 49 for receiving these interfaces, which are part of the handling envelope 35. When the fastening interfaces 43 are positioned in the receiving pockets 49, the pockets 49 are closed thanks to the closure means, and the sling fastening interfaces 43 are connected to the hoisting system 47, via the slings 45.

When the air inlet 33 is connected to the hoisting system 47, the air inlet 33 is detached from the fan casing of the turbojet engine 71 (FIG. 9).

The handling assembly is secured thanks to the main fastening straps 65. To this end, a first end 67 of the main fastening straps is attached to the inflatable flexible element 57 and a second end 69 of the main fastening straps is attached to the handling envelope 35.

According to a variation, the main fastening straps 65 connect the handling envelope 35 to the upstream protuberance of the inflatable flexible element 57, on the one hand, and to the central balloon 59 of the inflatable flexible element 57, on the other hand, at a downstream edge 79 of the central balloon 59 of the inflatable flexible element 57.

The present disclosure is not limited to the forms or variations of the handling assembly and method described hereinabove, but it encompasses all variants involving the technical equivalents of the described means as well as the combinations thereof if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handling assembly for handling a propulsion unit including a nacelle and an aircraft turbojet engine, said handling assembly comprising:
   a handling envelope covering at least a half-circumference of an outer wall of an air inlet of the nacelle, when said propulsion unit is mounted on said handling assembly;
   at least two interfaces for fastening slings, said slings being configured to be connected to a hoisting system external to said handling assembly; and
   an inflatable flexible element that, when inflated, comes into contact at least with an inner wall of the air inlet of the nacelle when the propulsion unit is mounted on said handling assembly.

2. The handling assembly according to claim 1, wherein said handling envelope further includes at least two receiving pockets for receiving said at least two interfaces for fastening said slings, configured to hold said at least two interfaces for fastening said slings in position on said handling envelope.

3. The handling assembly according to claim 2, wherein one interface of the at least two interfaces for fastening said slings includes:
   a plate, shaped to be inserted into one receiving pocket of the at least two receiving pocket; and
   a sling fastening fitting configured to receive one sling of said slings, the sling fastening fitting being secured to said plate.

4. The handling assembly according to claim 2, wherein the at least two receiving pockets for receiving said at least two interfaces for fastening said slings are positioned on either side of a longitudinal plane of the handling assembly.

5. The handling assembly according to claim 1, wherein said handling envelope includes a lateral extension shaped to at least partially cover a circumference of a downstream edge of the air inlet of the nacelle when the propulsion unit is mounted on the handling assembly.

6. The handling assembly according to claim 1, wherein the inflatable flexible element, when inflated, occupies an entire inner space defined by the inner wall of the air inlet of the nacelle when the propulsion unit is mounted on said handling assembly.

7. The handling assembly according to claim 1, wherein the inflatable flexible element includes an upstream protuberance coming into contact with a leading edge of the air inlet of the nacelle when said inflatable flexible element is inflated and when the propulsion unit is mounted on said handling assembly.

8. The handling assembly according to claim 1, further comprising main fastening straps, a first end of each of the main fastening straps being attached to the inflatable flexible element and a second end of each of the main fastening straps being attached to said handling envelope.

9. The handling assembly according to claim 1, further comprising a circumferential master strap, positioned on a flange for fastening the air inlet of the nacelle upstream of a fan casing of the aircraft turbojet engine.

10. The handling assembly according to claim 9, further comprising fastening straps, a first end of each of the fastening straps being attached to the circumferential master strap and a second end of each of the fastening straps being attached to said handling envelope.

11. A method for handling a propulsion unit, said propulsion unit comprising a nacelle comprising an air inlet and an aircraft turbojet engine, including a fan casing, on which said air inlet of said nacelle is attached, said method comprising:
   covering at least a half-circumference of an outer wall of the air inlet of the nacelle with the handling envelope of the handling assembly according to claim 1;
   positioning the at least two interfaces of the handling assembly according to claim 1 for fastening slings on the handling envelope;
   connecting the at least two interfaces for fastening said slings to a hoisting system external to said handling assembly by said slings; and
   detaching said air inlet from the fan casing of the aircraft turbojet engine.

12. The handling method according to claim 11, further comprising inflating the inflatable flexible element of the handling assembly inside an inner space defined by an inner wall of the air inlet of the nacelle until said inflatable flexible element comes into contact at least with the inner wall of the air inlet of the nacelle prior to covering at least the half-circumference of the outer wall of the air inlet of the nacelle with the handling envelope.

13. The handling method according to claim 12, further comprising securing the handling assembly by attaching a first end of each one of main fastening straps to the inflatable flexible element and a second end of each one of said main fastening straps to the handling envelope after detaching the air inlet from the fan casing of the aircraft turbojet engine.

14. The handling method according to claim 13, further comprising installing a circumferential master strap on a fastening flange of the air inlet of the nacelle upstream of the fan casing of the aircraft turbojet engine and attaching said master strap to the inflatable flexible element of the handling envelope by fastening straps prior to detaching the air inlet from the fan casing of the aircraft turbojet engine.

15. A method for handling a propulsion unit, said propulsion unit comprising a nacelle comprising an air inlet and an aircraft turbojet engine, including a fan casing, on which said air inlet of said nacelle is attached, said method comprising:

covering at least a half-circumference of an outer wall of the air inlet of the nacelle with a handling envelope of a handling assembly, wherein the handling assembly comprises the handling envelope covering at least the half-circumference of the outer wall of the air inlet of the nacelle, when said propulsion unit is mounted on said handling assembly, and at least two interfaces for fastening slings, said slings being configured to be connected to a hoisting system external to said handling assembly;

positioning the at least two interfaces of the handling assembly for fastening the slings on the handling envelope;

connecting the at least two interfaces for fastening said slings to the hoisting system external to said handling assembly by said slings;

inflating an inflatable flexible element of the handling assembly inside an inner space defined by the inner wall of the air inlet of the nacelle until said inflatable flexible element comes into contact at least with the inner wall of the air inlet of the nacelle prior to covering at least the half-circumference of the outer wall of the air inlet of the nacelle with the handling envelope; and detaching said air inlet from the fan casing of the aircraft turbojet engine.

* * * * *